United States Patent
Bradley et al.

(10) Patent No.: US 12,530,839 B2
(45) Date of Patent: Jan. 20, 2026

(54) RELIGHTABLE NEURAL RADIANCE FIELD MODEL

(71) Applicants: DISNEY ENTERPRISES, INC., Burbank, CA (US); ETH Zürich (Eidgenössische Technische Hochschule Zürich), Zürich (CH)

(72) Inventors: Derek Edward Bradley, Zürich (CH); Prashanth Chandran, Zürich (CH); Paulo Fabiano Urnau Gotardo, Zürich (CH); Yingyan Xu, Zürich (CH); Gaspard Zoss, Zürich (CH)

(73) Assignees: Disney Enterprises, INC., Burbank, CA (US); ETH Zürich (Eidgenössische Technische Hochschule Zürich), Zürich (CH)

( * ) Notice: Subject to any disclaimer, the term of this patent is extended or adjusted under 35 U.S.C. 154(b) by 153 days.

(21) Appl. No.: 18/505,009

(22) Filed: Nov. 8, 2023

(65) Prior Publication Data
US 2024/0161391 A1  May 16, 2024

Related U.S. Application Data

(60) Provisional application No. 63/383,459, filed on Nov. 11, 2022.

(51) Int. Cl.
*G06T 15/50* (2011.01)
*G06T 7/90* (2017.01)
*G06T 19/20* (2011.01)

(52) U.S. Cl.
CPC ............. *G06T 15/506* (2013.01); *G06T 7/90* (2017.01); *G06T 19/20* (2013.01);
(Continued)

(58) Field of Classification Search
None
See application file for complete search history.

(56) References Cited

PUBLICATIONS

Ben Mildenhall, NeRF: Representing Scenes as Neural Radiance Fields for View Synthesis, Aug. 3, 2020, Google Research (Year: 2020).*

(Continued)

*Primary Examiner* — Tammy Paige Goddard
(74) *Attorney, Agent, or Firm* — Squire Patton Boggs LLP; Sarah Mirza (57) ABSTRACT

The present invention sets forth a technique for generating two-dimensional (2D) renderings of a three-dimensional (3D) scene from an arbitrary camera position under arbitrary lighting conditions. This technique includes determining, based on a plurality of 2D representations of a 3D scene, a radiance field function for a neural radiance field (NeRF) model. This technique further includes determining, based on a plurality of 2D representations of a 3D scene, a radiance field function for a "one light at a time" (OLAT) model. The technique further includes rendering a 2D representation of the scene based on a given camera position and illumination data. The technique further includes computing a rendering loss based on the difference between the rendered 2D representation and an associated one of the plurality of 2D representations of the scene. The technique further includes modifying at least one of the NeRF and OLAT models based on the rendering loss.

20 Claims, 5 Drawing Sheets

(52) U.S. Cl.
CPC .............. *G06T 2207/10024* (2013.01); *G06T 2207/20081* (2013.01); *G06T 2207/20084* (2013.01); *G06T 2210/21* (2013.01); *G06T 2219/2012* (2013.01)

(56) References Cited

PUBLICATIONS

Tiancheng Sun, Light Stage Super-Resolution: Continuous High-Frequency Relighting, Dec. 2020, ACM Trans. Graph., vol. 39, No. 6, Article 261 (Year: 2020).*
Eisko, "Animatable Digital Double of Louise by Eisko", Retrieved from https://eisko.com/louise/, on Nov. 10, 2023, pp. 1-10.
Barron et al., "Mip-NeRF 360: Unbounded Anti-Aliased Neural Radiance Fields", CVPR, 2022, pp. 5470-5479.
Beeler et al., "High-Quality Single-Shot Capture of Facial Geometry", ACM Transactions on Graphics, http://doi.acm.org/10.1145/1778765.1778777, vol. 29, No. 4, Article 40, Jul. 2010, pp. 40:1-40:9.
Bi et al., "Deep Relightable Appearance Models for Animatable Faces", ACM Transactions on Graphics, https://doi.org/10.1145/3450626.3459829, vol. 40, No. 4, Article 89, Aug. 2021, pp. 89:1-89:15.
Bi et al., "Neural Reflectance Fields for Appearance Acquisition", arXiv:2008.03824, Aug. 16, 2020, pp. 1-11.
Bi et al., "Deep Reflectance vols. Relightable Reconstructions from Multi-View Photometric Images", arXiv:2007.09892, Jul. 20, 2020, pp. 1-21.
Boss et al., "NeRD: Neural Reflectance Decomposition from Image Collections", IEEE/CVF International Conference on Computer Vision, 2021, pp. 12684-12694.
Boss et al., "SAMURAI: Shape And Material from Unconstrained Real-world Arbitrary Image collections", arXiv:2205.15768, May 31, 2022, pp. 1-20.
Boss et al., "Neural-PIL: Neural Pre-Integrated Lighting for Reflectance Decomposition", 35th Conference on Neural Information Processing Systems, 2021, pp. 1-14.
Brox et al., "High Accuracy Optical Flow Estimation Based on a Theory for Warping", Springer, ECCV, vol. 3024, 2004, 13 pages.
Chan et al., "Efficient Geometry-aware 3D Generative Adversarial Networks", arXiv:2112.07945, Apr. 27, 2022, 27 pages.
Chen et al., "TensoRF: Tensorial Radiance Fields", In Computer Vision-ECCV 2022: 17th European Conference, 2022, pp. 1-18.
Debevec et al., "Acquiring the Reflectance Field of a Human Face", SIGGRAPH, 2000, pp. 1-12.
Fridovich-Keil et al., "Plenoxels: Radiance Fields without Neural Networks", IEEE/CVF Conference on Computer Vision and Pattern Recognition, 2022, pp. 5501-5510.
Gafni et al., "Dynamic Neural Radiance Fields for Monocular 4D Facial Avatar Reconstruction", CVPR, 2021, pp. 8649-8658.
Garbin et al., "FastNeRF: High-Fidelity Neural Rendering at 200FPS", ICCV, 2021, pp. 14346-14355.
Guo et al., "The Relightables: Volumetric Performance Capture of Humans with Realistic Relighting", ACM Transactions on Graphics, https://doi.org/10.1145/3355089.3356571, vol. 38, No. 6, Article 217, Nov. 2019, pp. 217:1-217:19.
Hong et al., "HeadNeRF: A Real-time NeRF-based Parametric Head Model", CVPR, 2022, pp. 20374-20384.
Kuang et al., "NeROIC: Neural Rendering of Objects from Online Image Collections", ACM Transactions on Graphics, https://doi.org/10.1145/3528223.3530177, vol. 41, No. 4, Article 56, Jul. 2022, pp. 56:1-56:19.
Li et al., "EyeNeRF: A Hybrid Representation for Photorealistic Synthesis, Animation and Relighting of Human Eyes", ACM Transactions on Graphics, https://doi.org/10.1145/3528223.3530130, vol. 41, No. 4, Article 166, Jul. 2022, pp. 166:1-166:16.
Liu et al., "Learning Smooth Neural Functions via Lipschitz Regularization", SIGGRAPH, Conference Proceedings, https://doi.org/10.1145/3528233.3530713, Aug. 7-11, 2022, pp. 1-13.
Lyu et al., "Neural Radiance Transfer Fields for Relightable Novel-view Synthesis with Global Illumination", ECCV, 2022, pp. 1-18.
Ma et al., "Rapid Acquisition of Specular and Diffuse Normal Maps from Polarized Spherical Gradient Illumination", Eurographics Symposium on Rendering, The Eurographics Association, 2007, 12 pages.
Martin-Brualla et al., "NeRF in the Wild: Neural Radiance Fields for Unconstrained Photo Collections", CVPR, 2021, pp. 7210-7219.
Meka et al., "Deep Reflectance Fields- High-Quality Facial Reflectance Field Inference from Color Gradient Illumination", ACM Transactions on Graphics, https://doi.org/10.1145/3306346.3323027, vol. 38, No. 4, Article 77, Jul. 2019, pp. 77:1-77:12.
Meka et al., "Deep Relightable Textures—Volumetric Performance Capture with Neural Rendering", ACM Transactions on Graphics, https://doi.org/10.1145/3414685.3417814, vol. 39, No. 6, Article 259, Dec. 2020, pp. 259:1-259:21.
Mildenhall et al., "NeRF in the Dark: High Dynamic Range View Synthesis from Noisy Raw Images", arXiv:2111.13679, Nov. 26, 2021, pp. 1-18.
Mildenhall et al., "NeRF: Representing Scenes as Neural Radiance Fields for View Synthesis", arXiv:2003.08934, Aug. 3, 2020, pp. 1-25.
Müller et al., "Instant Neural Graphics Primitives with a Multiresolution Hash Encoding", ACM Transactions on Graphics, https://doi.org/10.1145/3528223.3530127, vol. 41, No. 4, Article 102, Jul. 2022, pp. 102:1-102:15.
Munkberg et al., "Extracting Triangular 3D Models, Materials, and Lighting From Images", CVPR, 2022, pp. 8280-8290.
Nestmeyer et al., "Learning Physics-guided Face Relighting under Directional Light", CVPR, 2020, pp. 5124-5133.
Niemeyer et al., "GIRAFFE: Representing Scenes as Compositional Generative Neural Feature Fields", CVPR, 2021, pp. 11453-11464.
Nimeroff et al., "Efficient Re-rendering of Naturally Illuminated Environments", 5th Eurographics Workshop on Rendering, Jun. 1994, pp. 1-15.
Oechsle et al., "UNISURF: Unifying Neural Implicit Surfaces and Radiance Fields for Multi-View Reconstruction", ICCV, 2021, pp. 5589-5599.
Pandey et al., "Total Relighting: Learning to Relight Portraits for Background Replacement", ACM Transactions on Graphics, https://doi.org/10.1145/3450626.3459872, vol. 40, No. 4, Article 1, Aug. 2021, pp. 1:1-1:21.
Park et al., "Nerfies: Deformable Neural Radiance Fields", ICCV, 2021, pp. 5865-5874.
Park et al., "HyperNeRF: A Higher-Dimensional Representation for Topologically Varying Neural Radiance Fields", arXiv:2106.13228, Article 1, Sep. 10, 2021, pp. 1:1-1:16.
Pumarola et al., "D-NeRF: Neural Radiance Fields for Dynamic Scenes", arXiv:2011.13961, Nov. 27, 2020, pp. 1-10.
Riviere et al., "Single-Shot High-Quality Facial Geometry and Skin Appearance Capture", ACM Transactions on Graphics, https://doi.org/10.1145/3386569.3392464, vol. 39, No. 4, Article 81, Jul. 2020, pp. 81:1-81:12.
Rudnev et al., "Neural Radiance Fields for Outdoor Scene Relighting", arXiv:2112.05140, Dec. 9, 2021, pp. 1-13.
Srinivasan et al., "NeRV: Neural Reflectance and Visibility Fields for Relighting and View Synthesis", CVPR, 2021, pp. 7495-7504.
Sun et al., "NeLF: Neural Light-transport Field for Portrait View Synthesis and Relighting", Eurographics Symposium on Rendering, arXiv:2107.12351, Jul. 26, 2021, 12 pages.
Tancik et al., "Block-NeRF: Scalable Large Scene Neural View Synthesis", CVPR, 2022, pp. 8248-8258.
Turki et al., "Mega-NeRF: Scalable Construction of Large-Scale NeRFs for Virtual Fly-Throughs", CVPR, 2022, pp. 12922-12931.
Verbin et al., "Ref-NeRF: Structured View-Dependent Appearance for Neural Radiance Fields", In 2022 JEEE/CVF Conference on Computer Vision and Pattern Recognition (CVPR), 2022, pp. 5491-5500.
Wang et al., "MoRF: Morphable Radiance Fields for Multiview Neural Head Modeling", SIGGRAPH Conference Proceedings, https://doi.org/10.1145/3528233.3530753, Aug. 7-11, 2022, 9 pages.

(56) References Cited

PUBLICATIONS

Wang et al., "NeuS: Learning Neural Implicit Surfaces by Volume Rendering for Multi-view Reconstruction", 35th Conference on Neural Information Processing Systems, 2021, pp. 1-13.

Xu et al., "Improved Lighting Models for Facial Appearance Capture", The Eurographics Association, vol. 41, No. 2, 2022, 4 pages.

Yang et al., "PS-NeRF: Neural Inverse Rendering for Multi-view Photometric Stereo", arXiv:2207.11406, Dec. 22, 2022, pp. 1-28.

Yao et al., "NeILF: Neural Incident Light Field for Physically-based Material Estimation", 2022, 22 pages.

Yu et al., "PlenOctrees for Real-time Rendering of Neural Radiance Fields", ICCV, 2021, pp. 5752-5761.

Zhang et al., "NeRS: Neural Reflectance Surfaces for Sparse-view 3D Reconstruction in the Wild", 35th Conference on Neural Information Processing Systems, 2021, pp. 1-13.

Zhang et al., "IRON: Inverse Rendering by Optimizing Neural SDFs and Materials from Photometric Images", CVPR, 2022, pp. 5565-5574.

Zhang et al., "Neural Light Transport for Relighting and View Synthesis", ACM Transactions on Graphics, https://doi.org/10.1145/3446328, vol. 40, No. 1, Jan. 20, 2021, pp. 1-16.

Zhang et al., "NeRFactor: Neural Factorization of Shape and Reflectance Under an Unknown Illumination", ACM Transactions on Graphics, https://doi.org/10.1145/3478513.3480496, vol. 40, No. 6, Article 237, Dec. 2021, pp. 237:1-237:18.

Zhang et al., "Modeling Indirect Illumination for Inverse Rendering", In Proceedings of the IEEE/CVF Conference on Computer Vision and Pattern Recognition, 2022, pp. 18643-18652.

Zheng et al., "Neural Relightable Participating Media Rendering", 35th Conference on Neural Information Processing Systems, 2021, pp. 1-13.

Xu et al., "ReNeRF: Relightable Neural Radiance Fields with Nearfield Lighting (Supplementary Material)", 2023, 7 pages.

Xu et al., "ReNeRF: Relightable Neural Radiance Fields with Nearfield Lighting", ICCV, 2023, pp. 22581-22591.

* cited by examiner

RELIGHTABLE NEURAL RADIANCE FIELD MODEL

CROSS-REFERENCE TO RELATED APPLICATIONS

This application claims priority benefit to U.S. provisional application titled "RELIGHTABLE NEURAL RADIANCE FIELD MODEL," filed on Nov. 11, 2022, and having Ser. No. 63/383,459. This related application is also hereby incorporated by reference in its entirety.

BACKGROUND

Field of the Various Embodiments

Embodiments of the present disclosure relate generally to machine learning and computer vision and, more specifically, to techniques for creating representations of one or more three-dimensional (3D) objects in a scene from one or more two-dimensional (2D) representations of the scene.

Description of the Related Art

Generating a 3D representation of a scene including one or more 3D objects is a common task in the fields of computer vision and computer graphics. This representation of the scene may be generated from one or more 2D representations of the scene. In some applications, different representations of a scene are generated from different viewpoints, where a viewpoint is a combination of a specific camera location and a specific orientation of the camera relative to the scene. For instance, multiple 2D representations of a scene may have been captured by placing one or more cameras at specific locations and with specific orientations relative to the scene. The captured 2D representations can then be used to generate additional 2D representations of the scene from different camera viewpoints. Further, generating different 2D representations of a scene also allows creators to modify the scene. For example, objects (either real or computer-generated) may be added to the scene, objects may be removed from the scene, or the relative positions of objects in the scene may be altered.

Existing techniques for generating 3D representations of scenes may make use of neural radiance fields. A neural radiance field (NeRF) is a machine learning model that is trained on a training data set including multiple 2D representations of a scene captured from various camera viewpoints and orientations. The output of a trained NeRF is a radiance field function that produces a color value and a volume density for any given combination of a 3D location within the scene and a viewing angle to the 3D location from a specified viewpoint within the scene. The trained NeRF may be used to generate 2D representations of the scene for arbitrary camera viewpoints.

One drawback of NeRFs is that the output of the trained NeRF is dependent upon the scene illumination at the time that the multiple 2D representations of the scene in the training data set were captured. During training, the NeRF learns the characteristics of the scene illumination in addition to learning the characteristics of the objects depicted in the scene. The output of the trained NeRF for a given 3D location in the scene from a given viewpoint includes the light emitted from the 3D location toward the viewpoint as determined by the scene illumination present in the multiple 2D representations of the scene. Consequently, the output of a NeRF that has been trained on 2D representations of a scene captured under specific illumination conditions (e.g., in a photo or movie studio) may not be rendered realistically within another environment that has different illumination conditions. Since the performance of a NeRF trained on a given training data set does not scale to environments having different illumination conditions, a trained NeRF often has limited utility.

As the foregoing illustrates, what is needed in the art are more effective techniques generating 3D representations of scenes having different illumination conditions.

SUMMARY

One embodiment of the present invention sets forth a technique for performing scene rendering. The technique includes determining, for each of a plurality of three-dimensional (3D) locations in a 3D scene, a density value associated with the 3D location based on an output of a first trained machine learning model and determining, for each of the plurality of 3D locations, a diffuse color value and a specular color value associated with the 3D location based on a given camera location, a given lighting map, and an output of a second trained machine learning model. The technique also determining a pixel color value for each of a plurality of pixels in a two-dimensional (2D) representation of the scene based on the density values, the diffuse color values, and the specular color values associated with the plurality of 3D locations. The technique further includes generating, based on the pixel color values associated with the plurality of pixels, a 2D rendering of the scene.

One technical advantage of the disclosed technique relative to the prior art is that the disclosed technique may generate 2D representations of a scene not only from arbitrary viewpoints but also under arbitrary lighting conditions. Unlike existing techniques that are limited to producing 2D representations with fixed illumination characteristics, the disclosed technique allows for realistically rendering 2D representations of a scene into a variety of environments with different illumination conditions.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
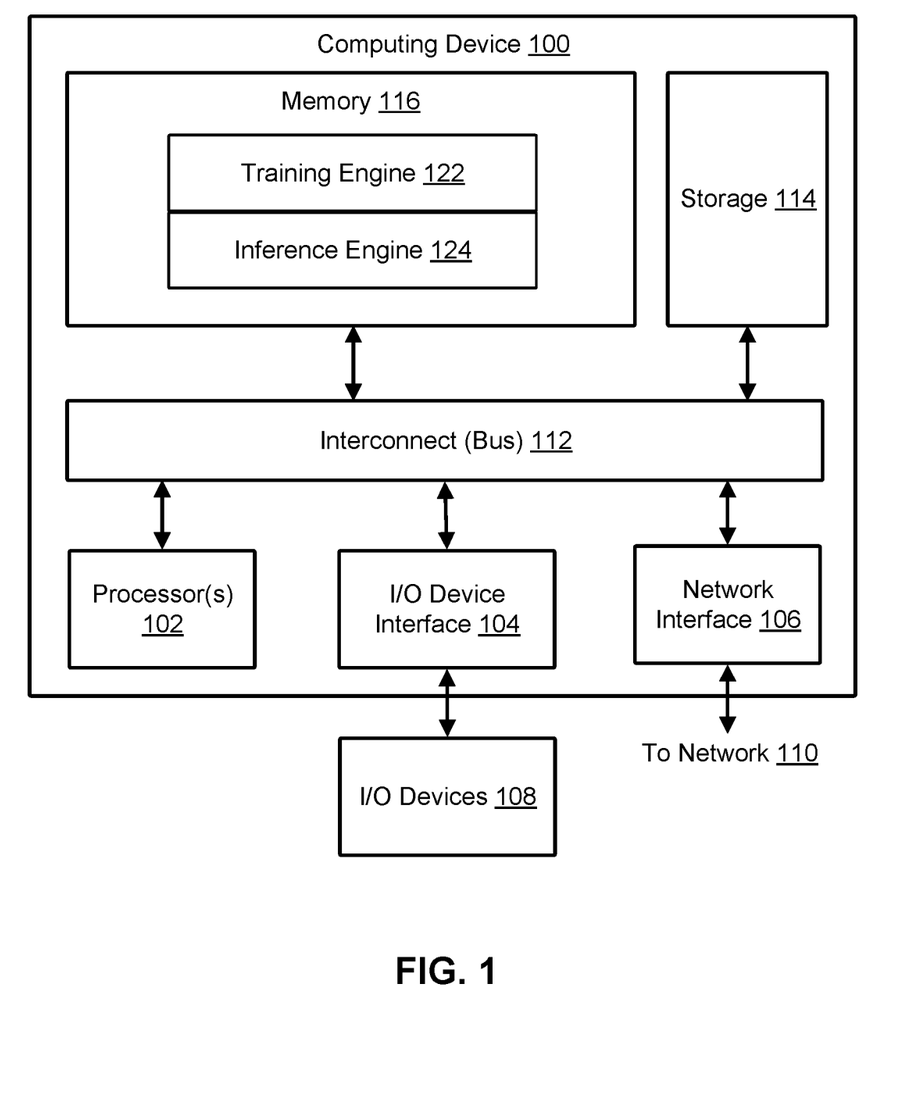
FIG. 1 illustrates a computer system configured to implement one or more aspects of various embodiments.

FIG. 1 illustrates a computing device 100 configured to implement one or more aspects of various embodiments. In one embodiment, computing device 100 includes a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a training engine 122 and an inference engine 124 that reside in a memory 116.

It is noted that the computing device described herein is illustrative and that any other technically feasible configurations fall within the scope of the present disclosure. For example, multiple instances of training engine 122 and inference engine 124 could execute on a set of nodes in a distributed and/or cloud computing system to implement the functionality of computing device 100. In another example, training engine 122 and/or inference engine 124 could execute on various sets of hardware, types of devices, or environments to adapt training engine 122 and/or inference engine 124 to different use cases or applications. In a third example, training engine 122 and inference engine 124 could execute on different computing devices and/or different sets of computing devices.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

I/O devices 108 include devices capable of providing input, such as a keyboard, a mouse, a microphone, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Training engine 122 and inference engine 124 may be stored in storage 114 and loaded into memory 116 when executed.

Memory 116 includes a random access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including training engine 122 and inference engine 124.

In some embodiments, training engine 122 trains one or more machine learning models to perform 2D scene representation. Training engine 122 trains one or more machine learning models on a data set of 2D representations of a scene under varying lighting conditions. The output of each of the one or more machine learning models is a radiance field function, and the combined output of the one or more machine learning models is a combined radiance field function. Given a 3D location within the scene, a viewing angle to the 3D location from a specified viewpoint in the scene, and environmental illumination information, the combined radiance field function returns color values and a volume density value for the 3D location within the scene. By repeatedly applying the radiance field function to every 3D location in the scene, the technique may produce 2D representations of the scene from any specified viewpoint under any specified illumination conditions, including novel viewpoints and illumination conditions not included in the training data set.

More specifically, training engine 122 is configured to analyze multiple 2D representations of a scene captured from different viewpoints and under different illumination conditions. Training engine 122 trains a neural radiance field (NeRF) machine learning model (hereinafter "NeRF model") to generate volume density values for 3D locations within the scene. Training engine 122 further trains a "one light at a time" machine learning model (hereinafter "OLAT model") to generate diffuse and specular color values for 3D locations in the scene based on an output from the NeRF model and illumination information based on an arbitrary lighting map. Training engine 122 iteratively adjusts trainable parameters of one or more of the NeRF and OLAT models, such as neural network node weights, based on a rendering loss that represents at least a difference between color values generated for a 3D location within the scene and a ground truth color value for the 3D location within the scene.

Figure 2:
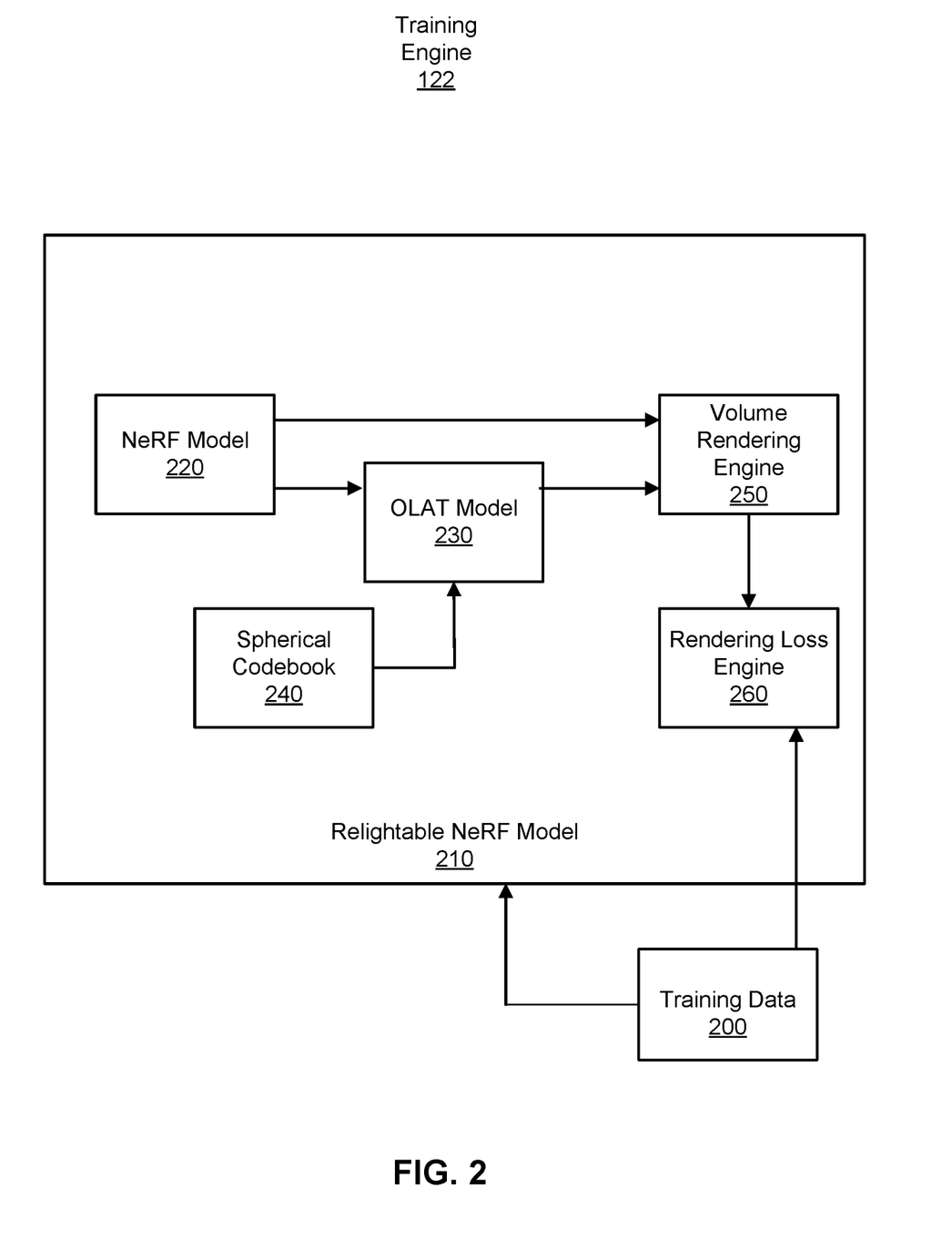
FIG. 2 is a more detailed illustration of training engine 122 of FIG. 1, according to some embodiments.

FIG. 2 is a more detailed illustration of training engine 122 of FIG. 1, according to some embodiments. As shown, training engine 122 includes relightable NeRF model 210 and training data 200. Relightable NeRF model 210 further includes neural radiance field (NeRF) model 220, "one light at a time" (OLAT) model 230, spherical codebook 240, volume rendering engine 250, and rendering loss engine 260.

Training engine 122 trains relightable NeRF model 210 on multiple 2D representations of a 3D scene under a variety of lighting conditions to generate a combined radiance field function. The combined radiance field function generates color values and a volume density value for a given 3D location in the scene based on a given lighting environment and a given viewing angle. "Relightable" refers to relightable NeRF model 210's ability to generate color values and a volume density value based on a given lighting environment, rather than being limited to the lighting conditions present in the 2D representations used to train relightable NeRF model 210.

Training data 200 includes a plurality of 2D representations of the scene captured from multiple camera locations under multiple lighting conditions. For example, the scene may be illuminated by one or more of thirty-two light sources positioned in different locations, and the scene may be captured by one or more of ten cameras positioned in different locations. Training data 200 includes a plurality of 2D representations, each representing the scene as illuminated by a single light source and captured by a single camera. For the exemplary configuration of thirty-two light sources and ten cameras, training data 200 includes 320 2D representations. In some embodiments, training data 200 further includes 2D representations of the scene captured by each camera with all light sources illuminated, as well as 2D representations of the scene captured by each camera with all light sources extinguished.

A subset of the cameras may be arranged as one or more stereo pairs of cameras, each stereo pair of cameras configured to calculate a depth value from the stereo pair of cameras to the scene. These calculated depth values are associated with the stereo pair of cameras and are stored in training data 200.

For each of the plurality of 2D representations, training data 200 includes a record of which of the plurality of light sources were illuminated when the 2D representation was captured and the position of the camera that captured the 2D representation. For each pixel in each of the plurality of 2D representations, training data 200 further includes ground truth data representing a color value for the pixel.

Relightable NeRF model 210 includes a neural radiance field (NeRF) model 220. NeRF model 220 is a machine learning model and includes a plurality of trainable parameters. For a given 3D location $x_i$ in a scene, NeRF model 220 generates a density value a for the 3D location and transmits the density value a to volume rendering engine 250 discussed below. Density value a is a radiance function generated by NeRF model 220. NeRF model 220 further generates a neural feature vector $f_i$ for each 3D location $x_i$ in the scene and transmits the neural feature vector $f_i$ to OLAT model 230 discussed below. In some embodiments, neural feature vector $f_i$ may be a 256-dimensional vector.

Relightable NeRF model 210 includes spherical codebook 240. For a given 3D location $x_i$ in a scene, training engine 122 generates an OLAT basis based on a lighting direction $\omega_i$ from a given illuminated light source p in training data 200 to the given 3D location in the scene. Training engine 122 transmits the OLAT basis to spherical codebook 240. Spherical codebook 240 includes an indexed collection of codes based on possible lighting directions for a scene. These codes are used as input features for OLAT model 230 described below. Spherical codebook 240 is indexed on a K-order spherical harmonic parameterization $SH(\omega_i)$ of the lighting direction $\omega_i$. In some embodiments, spherical codebook 240 is indexed on a 5th-order spherical harmonic parameterization $SH(\omega_i)$ for the lighting direction $\omega_i$. Spherical harmonic parameterization $SH(\omega_i)$ is a representation of the spatial relationship between the given illuminated light source and the 3D location in the scene. Spherical codebook 240 includes a coefficient matrix C of learnable parameters. Training engine 122 queries spherical codebook 240 on the spherical harmonic parameterization $SH(\omega_i)$ and spherical codebook 240 multiplies the spherical harmonic parameterization $SH(\omega_i)$ by coefficient matrix C to generate OLAT code $o_{\omega i}$. OLAT code $o_{\omega i}$ is a vector, for example a 256-dimensional vector. Spherical codebook 240 transmits OLAT code $o_{\omega i}$ to OLAT model 230.

OLAT model 230 is a machine learning model that generates a diffuse color value and a specular color value for a given 3D location $x_i$ in a scene. For a given 3D location $x_i$ in a scene, OLAT model 230 receives as input the neural feature vector $f_i$ from NeRF model 220, the OLAT code $o_{\omega i}$ from spherical codebook 240, and a directional viewing ray $\omega_o$ representing a direction from a camera to the given 3D location $x_i$ in the scene.

Based on OLAT code $o_{\omega i}$ received from spherical codebook 240 and neural feature vector $f_i$ received from NeRF model 220, OLAT model 230 generates a diffuse color value $c_{i,d}$ and a specular color value $c_{i,s}$ for the given 3D location $x_i$ in the scene. Diffuse color value $c_{i,d}$ and specular color value $c_{i,s}$ collectively form a radiance field function generated by OLAT model 230.

Volume rendering engine 250 generates 2D renderings of a scene based on density values received from NeRF model 220, diffuse and specular color values received from OLAT model 230, and a calculated directional viewing ray $\omega_o$ representing a direction from a camera position to a given 3D location $x_i$ in the scene. For each pixel in a generated 2D rendering, volume rendering engine 250 calculates the directional viewing ray $\omega_o$ that passes through the camera, the pixel, and the scene. Volume rendering engine 250 determines a plurality of 3D locations within the scene that intersect directional viewing ray $\omega_o$. For the plurality of 3D locations within the scene that intersect directional viewing ray $\omega_o$, volume rendering engine 250 combines the density, diffuse color, and specular color values generated by NeRF model 220 and OLAT model 230. Volume rendering engine 250 generates a color value for the pixel in the 2D rendering. After volume rendering engine 250 generates a color value for each pixel in the 2D rendering, volume rendering engine 250 transmits the 2D rendering to rendering loss engine 260.

Rendering loss engine 260 generates a rendering loss that represents the difference between a 2D rendering of a scene generated by volume rendering engine 250 for a particular combination of camera position and light sources and ground truth data from training data 200. In various embodiments, the rendering loss is a pixelwise mean-squared error loss based on the difference between a predicted color value for a pixel in the 2D rendering and ground truth color data for the corresponding pixel in training data 200. In various embodiments, each 2D rendering in training data 200 may include a background mask that defines portions of the 2D rendering that represent a background of a scene rather than an object in the scene. The rendering loss may include a term that penalizes density values calculated by NeRF model 220 for 3D locations in the scene that represent empty space based on the directional viewing ray coo and the background mask. Training data 200 may also include depth maps representing ground truth distances from one or more cameras to locations within the scene. The rendering loss may include a term that penalizes differences between calculated and ground truth depth values.

To enforce smoothness and avoid overfitting, rendering loss engine 260 may apply regularization to coefficient matrix C. The regularization is based on the order K of the spherical harmonic parameterization described above and penalizes high-frequency specular color coefficients generated by OLAT model 230.

Training engine 122 may train relightable NeRF model 210 until a predetermined training time has elapsed, a predetermined number of training iterations have been completed, or until the rendering loss from rendering loss engine 260 is below a predetermined threshold. During training, training engine 122 iteratively adjusts the parameters of coefficient matrix C of spherical codebook 240, NeRF model 220, and OLAT model 230 based on the rendering loss. Training engine 122 transmits training data 200 to relightable NeRF model 210. As described above, training data includes a plurality of 2D representations of a scene, with each 2D representation including ground truth color values for each pixel in the 2D representation. Each 2D representation further includes ground truth data for the location of a camera used to capture the 2D representation and the location of one or more light sources illuminating the scene during capture.

For each 3D location $x_i$ in the scene, training engine 122 transmits 3D location $x_i$ to NeRF model 220. NeRF model 220 generates neural feature vector $f_i$ and density value a based on the 3D location $x_i$. NeRF model 220 transmits neural feature vector $f_i$ to OLAT model 230 and transmits density value a to volume rendering engine 250.

Training engine 122 generates an OLAT basis based on a light direction $\omega_i$ from a given illuminated light source p in training data 200 to the 3D location in the scene and transmits the OLAT basis to spherical codebook 240. Training engine 122 queries spherical codebook 240 on a K-order spherical harmonic parameterization $SH(\omega_i)$ of the OLAT basis. Spherical codebook 240 multiplies the spherical harmonic parameterization by a coefficient matrix C to generate OLAT code $o_{\omega i}$. Spherical codebook 240 transmits OLAT code $o_{\omega i}$ to OLAT model 230.

Based on OLAT code $o_{\omega i}$ and the neural feature vector $f_i$ received from NeRF model 220, OLAT model 230 generates a radiance field function including a diffuse color value $c_{id}$ and a specular color value $c_{is}$ for the given 3D location $x_i$ in the scene.

If a 2D representation from training data 200 includes ground truth data for more than one illuminated light source p, training engine 122 repeatedly generates an OLAT basis associated with a light direction from each illuminated light source p and queries spherical codebook 240 for each illuminated light source p. For the 3D location $x_i$, spherical codebook 240 generates an OLAT code $o_{\omega i}$ for each additional light source and OLAT model 230 generates diffuse color values $c_{id}$ and specular color values $c_{is}$ associated with each additional light source p. Training engine 122 generates combined diffuse and specular color values based on a weighted combination of the diffuse color values and specular color values associated with the each of the plurality of illuminated light sources.

The neural feature vector $f_i$ and density value $\sigma_i$ generated by NeRF model 220 are only generated once for each 3D location $x_i$ in the scene, regardless of the number of light sources. The neural feature vector $f_i$ transmitted from NeRF model 220 to OLAT model 230 is held constant for each 3D location $x_i$ in the scene.

Training engine 122 continues processing 3D locations in the scene until NeRF model 220 and OLAT model 230 have generated density, diffuse color, and specular color values for all 3D locations in the scene.

Volume rendering engine 250 analyzes the diffuse color and specular color values generated for 3D locations in the scene and generates a 2D rendering of the scene as described above based on the density, diffuse color and specular color values for 3D locations in the scene generated by NeRF model 220 and OLAT model 230. Volume rendering engine 250 transmits the generated 2D rendering to rendering loss engine 260.

Rendering loss engine 260 generates a rendering loss for the generated 2D rendering that represents a difference between the generated 2D rendering and the ground truth data associated with the 2D rendering in training data 200. As described above in various embodiments, the rendering loss may include one or more terms representing pixelwise differences in color values between the generated 2D rendering and the ground truth data. Training engine 122 analyzes the rendering loss and if the rendering loss is below a predetermined threshold, training engine 122 may terminate training. Training engine 122 may also terminate training if a predetermined training time has elapsed or if a predetermined number of training iterations have been completed. If the rendering loss is at or above the predetermined threshold and neither the predetermined training time nor predetermined number of iterations have been exceeded, training engine 122 continues training relightable NeRF model 210.

Figure 3:
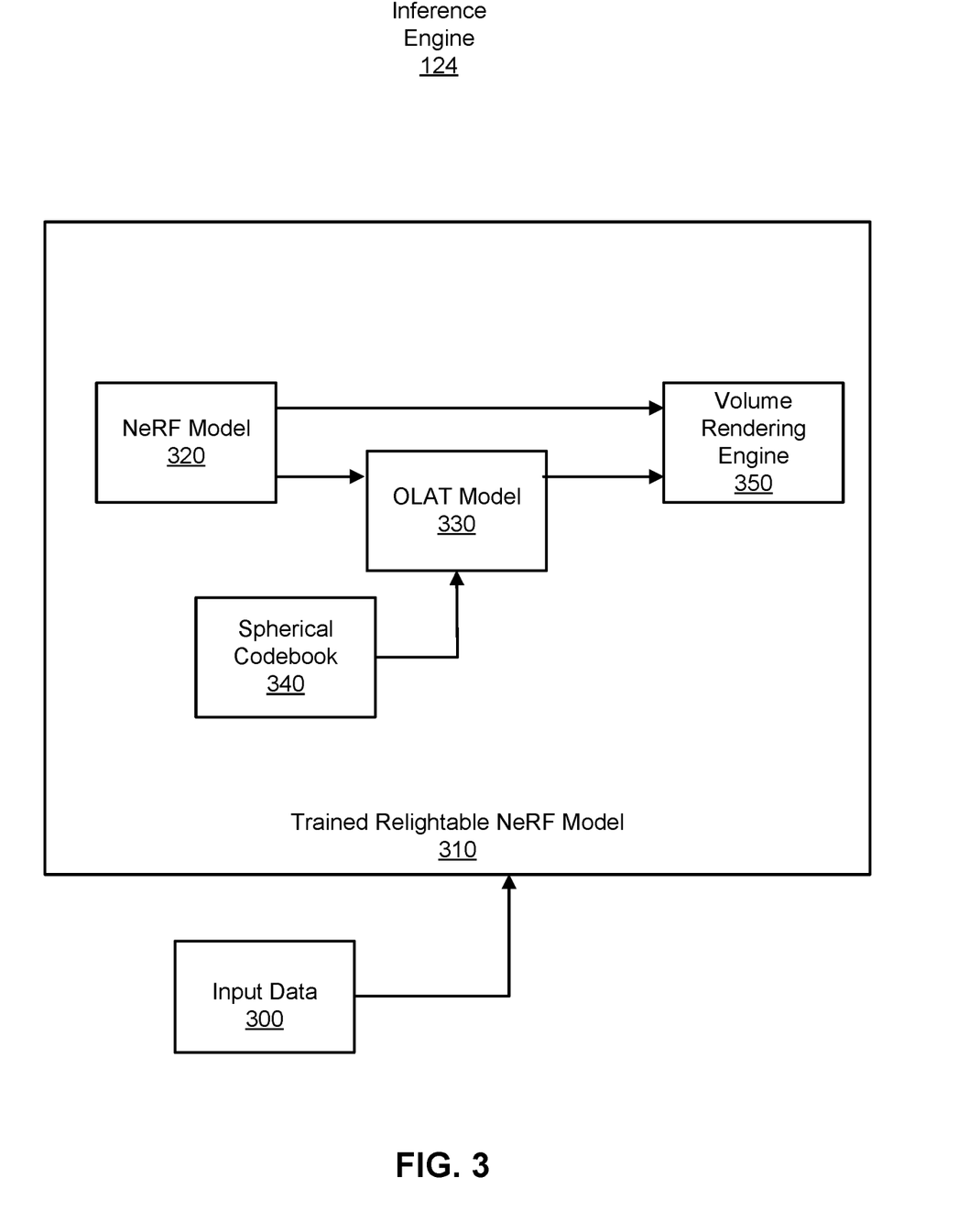
FIG. 3 is a more detailed illustration of inference engine 124 of FIG. 1, according to some embodiments.

FIG. 3 is a more detailed illustration of inference engine 124 of FIG. 1, according to some embodiments. Given a trained relightable NeRF model 310, inference engine 124 generates a 2D rendering of a scene that represents the scene as captured from a given camera position and as illuminated by a given plurality of light sources. As shown, inference engine 124 further includes input data 300, NeRF model 320, OLAT model 330, spherical codebook 340, and volume rendering engine 350.

Input data 300 includes a given camera position and a lighting map that includes position and intensity values for a plurality of light sources. Inference engine 124 transmits input data 300 to trained relightable NeRF model 310.

For each pixel in the generated 2D rendering, volume rendering engine 350 calculates a directional viewing ray $\omega_o$ from the given camera position through the pixel into the scene. Volume rendering engine calculates a plurality of 3D positions $x_i$ in the scene that intersect directional viewing ray $\omega_o$. For each of the plurality of 3D positions $x_i$ in the scene that intersect directional viewing ray $\omega_o$, inference engine 124 transmits the 3D position $x_i$ to NeRF model 320.

NeRF model 320 receives the 3D position $x_i$ in the scene and calculates a density value a associated with the 3D position $x_i$. NeRF model 320 further generates a neural feature vector $f_i$ and transmits the neural feature vector to OLAT model 330.

Inference engine 124 generates an OLAT basis based on a direction $\omega_i$ from a given illuminated light source p in input data 300 to the 3D location $x_i$ in the scene and transmits the OLAT basis to spherical codebook 340. Spherical codebook 340 is indexed on a K-order spherical harmonic parameterization $SH(\omega_i)$ for the light direction $\omega_i$. In some embodiments, spherical codebook 340 is indexed on a $5^{th}$-order spherical harmonic parameterization $SH(\omega_i)$ for the lighting direction $\omega_i$. Spherical harmonic parameterization $SH(\omega_i)$ is a representation of the spatial relationship between the given illuminated light source and the 3D location in the scene. Spherical codebook 340 includes a coefficient matrix C of learnable parameters. Inference engine 124 queries spherical codebook 340 on the spherical harmonic parameterization $SH(\omega_i)$ and spherical codebook 340 multiplies the spherical harmonic parameterization $SH(\omega_i)$ by coefficient matrix C to generate OLAT code $o_{\omega i}$. OLAT code $o_{\omega i}$ is a vector, for example a 256-dimensional vector. Spherical codebook 340 transmits OLAT code $o_{\omega i}$ to OLAT model 330.

Based on OLAT code $o_{\omega i}$ from spherical codebook 340 and the neural feature vector $f_i$ received from NeRF model 320, OLAT model 330 generates a diffuse color value $c_{i,d}$ and a specular color value $c_{i,s}$ for the given 3D location $x_i$ in the scene.

If input data 300 includes position data for more than one illuminated light source p, inference engine 124 repeatedly generates an OLAT basis associated with each light source p and transmits the OLAT basis to spherical codebook 340. Spherical codebook 340 and OLAT model 330 process the OLAT basis as described above to generate additional diffuse color values $c_{i,d}$ and specular color values $c_{i,s}$ for the 3D locations $x_i$ associated with each additional light source p. Inference engine 124 generates combined diffuse and specular color values for the 3D location $x_i$ based on a weighted combination of the diffuse color values and specular color values associated with each additional light source.

The neural feature vector $f_i$ and density value a generated by NeRF model 320 are only generated once for each 3D location $x_i$ in the scene, regardless of the number of light sources in input data 300. The neural feature vector $f_i$ transmitted from NeRF model 320 to OLAT model 330 is held constant for the 3D location $x_i$ in the scene.

Volume rendering engine 350 repeats the above process for each of the plurality of 3D locations $x_i$ in the scene that intersect directional viewing ray $\omega_o$. Volume rendering engine 350 generates a color value for the pixel in the 2D rendering based on the color and density values for each of the plurality of 3D positions $x_i$ in the scene that intersect directional viewing ray $\omega_o$. Volume rendering engine 350 repeats the above process for each of the pixels in the 2D rendering and generates a completed 2D rendering of the scene.

Figure 4:
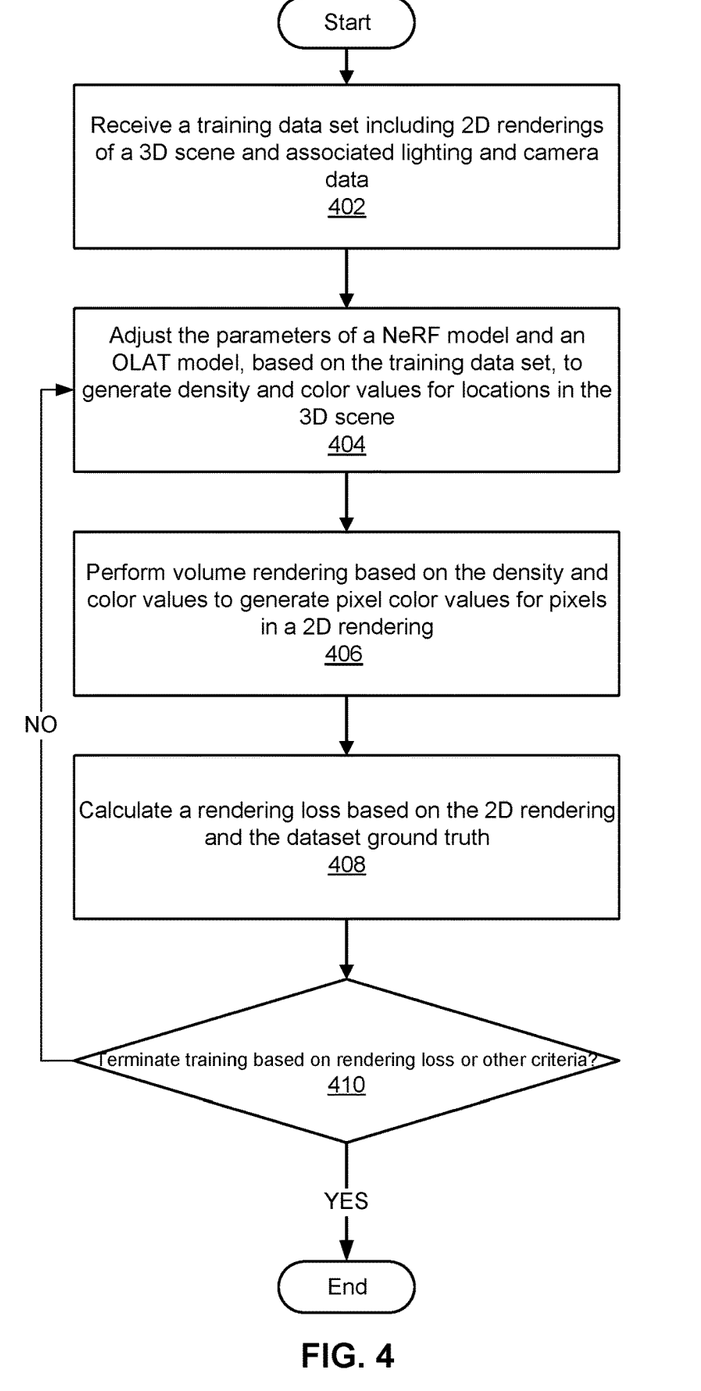
FIG. 4 is a flow diagram of method steps for training a machine learning model to generate 2D renderings of a 3D scene, according to various embodiments.

FIG. 4 is a flow diagram of method steps for training a machine learning model to generate 2D renderings of a 3D scene, according to various embodiments. Although the method steps are described in conjunction with the systems of FIGS. 1-3, persons skilled in the art will understand that any system configured to perform the method steps in any order falls within the scope of the present disclosure.

As shown, in operation 402, training engine 122 receives training data 200. Training data 200 includes multiple 2D representations of a 3D scene and ground truth data associated with each 2D representation describing the location of a camera used to capture the scene and the locations of one or more light sources illuminating the captured scene.

In operation 404, training engine 122 trains a NeRF model 220 and an OLAT model 230 by iteratively adjusting parameters of one or more of the NeRF and OLAT models. For each 3D position in the scene, NeRF model 220 generates a density value for the 3D location and a neural feature vector. NeRF model 220 transmits the neural feature vector to OLAT model 230.

Training engine 122 generates an OLAT basis based on a direction from a light source in the training data to the 3D location in the scene. Training engine 122 transmits the OLAT basis to spherical codebook 240. Spherical codebook 240 generates an OLAT code and transmits the OLAT code to OLAT model 230.

OLAT model 230 generates diffuse and specular color values for the 3D location in the scene, based on the neural feature vector received from the NeRF model and the OLAT code received from the spherical codebook. If the training data includes multiple light sources, training engine 122 generates an OLAT basis for each light source and OLAT model 230 generates separate diffuse and specular color values for the 3D location based on each of the plurality of light sources. Training engine 122 combines the separate diffuse and specular color values for the 3D location in the scene.

In operation 406, training engine 122 performs volume rendering based on the density and color values generated by NeRF model 220 and OLAT model 230. Based on the camera location data from training data 200, volume rendering engine 250 generates a directional viewing ray from the camera through a pixel of a 2D rendering and into the 3D scene modeled by the NeRF and OLAT models. For each of a plurality of 3D locations in the scene that intersect the directional viewing ray, volume rendering engine 250 calculates a density value and color values based on the outputs of the NeRF and OLAT models. Volume rendering engine 250 generates a color value for the pixel based on the density and color values of the 3D locations that intersect the directional viewing ray. Volume rendering engine repeats the above process for each pixel in the 2D rendering and transmits the completed 2D rendering to rendering loss engine 260.

In operation 408, training engine 122 generates a rendering loss based on a difference between the 2D rendering generated by volume rendering engine 250 and ground truth data for the 2D representation in training data 200. In various embodiments, the rendering loss may be a pixelwise mean-squared error loss based on the difference between a predicted color value for a pixel in the 2D rendering and ground truth color data for the corresponding pixel in the ground truth data for the 2D representation in training data 200. In various embodiments, each 2D representation in training data 200 may include a background mask that defines portions of the 2D representation that represent a background of a scene rather than an object in the scene. The rendering loss may include a term that penalizes density values calculated by NeRF model 220 for 3D locations in the scene that represent empty space based on the directional viewing ray coo and the background mask. Training data 200 may also include depth maps representing ground truth distances from one or more cameras to locations within the scene. The rendering loss may include a term that penalizes differences between calculated and ground truth depth values.

To enforce smoothness and avoid overfitting, rendering loss engine may apply regularization to coefficient matrix C. The regularization is based on the order K of the spherical harmonic parameterization described above and penalizes high-frequency specular color coefficients generated by OLAT model 230.

In operation 410, training engine 122 compares the rendering loss to a predetermined threshold. If the rendering loss is less than the predetermined threshold, training engine 122 terminates training of relightable NeRF model 210. Training engine 122 may also terminate training if a predetermined training time has elapsed or if a predetermined number of training iterations have been completed. If the rendering loss is at or above the predetermined threshold and neither the predetermined training time nor predetermined number of iterations have been exceeded, training engine 122 returns to operation 404 and continues training relightable NeRF model 210 with additional training data from training data 200.

Figure 5:
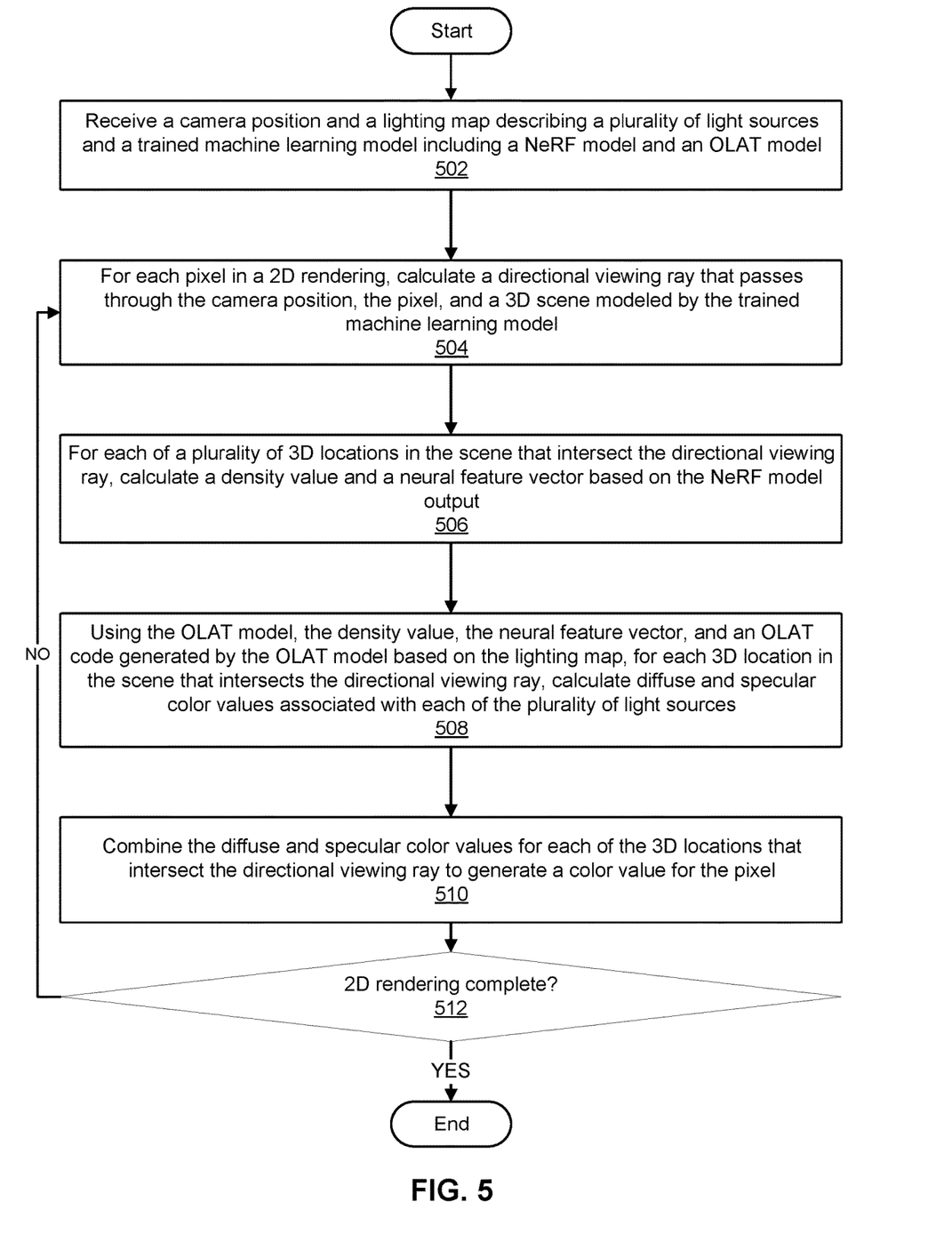
FIG. 5 is a flow diagram of method steps for generating a 2D rendering of a 3D scene, according to various embodiments.

FIG. 5 is a flow diagram of method steps for generating a 2D rendering of a scene, according to various embodiments. Although the method steps are described in conjunction with the systems of FIGS. 1-3, persons skilled in the art will understand that any system configured to perform the method steps in any order falls within the scope of the present disclosure.

As shown, in operation 502, inference engine 124 receives a trained relightable NeRF model 310 and input data 300 including a given camera position and a lighting map that includes position and intensity data for a plurality of illuminated light sources.

In operation 504, inference engine 124 performs volume rendering to generate a 2D rendering of a scene modeled by NeRF model 320 and OLAT model 330 of trained relightable NeRF model 310. Based on the camera location data from input data 300, volume rendering engine 350 generates a directional viewing ray from the camera through a pixel of a 2D rendering and into the 3D scene modeled by the trained NeRF and OLAT models.

In operation 506, for each of a plurality of 3D locations in the scene that intersect the directional viewing ray, inference engine 124 calculates a density value and a neural feature vector based on the outputs of NeRF model 320.

In operation 508, inference engine 124 calculates diffuse and specular color values for each of the 3D locations that intersect the directional viewing ray. Inference engine 124 generates an OLAT basis based on a direction from a light source in input data 300 to the 3D location in the scene. Inference engine 124 transmits the OLAT basis to spherical codebook 340. Spherical codebook 340 generates an OLAT code and transmits the OLAT code to OLAT model 330.

OLAT model 330 generates diffuse and specular color values for the 3D location in the scene, based on the neural feature vector received from the NeRF model and the OLAT code received from the spherical codebook. If input data 300 includes multiple light sources, inference engine 124 generates an OLAT basis for each light source and OLAT model 330 generates separate diffuse and specular color values for the 3D location based on each of the plurality of light sources. Inference engine 124 combines the separate diffuse and specular color values for the 3D location in the scene.

In operation 510, inference engine 124 analyzes the diffuse and specular color values for each of the 3D locations that intersect the directional viewing ray and generates a color value for the pixel of the 2D rendering.

In operation 512, inference engine 124 determines whether a color value has been generated for every pixel in the 2D rendering. If a color value has been generated for every pixel in the 2D rendering, the method terminates. If there are remaining pixels in the 2D rendering for which color values have not been generated, the method returns to operation 504.

In sum, a training engine processes multiple 2D representations of a 3D scene from varying viewpoints and under varying illumination conditions to train a relightable neural radiance field (NeRF) model including a NeRF model and a "one light at a time" (OLAT) model. The output of the trained relightable NeRF model is a combined radiance field function representing the scene. The combined radiance field function maps a 3D location within the scene, an associated viewing direction, and given illumination information for the scene to a diffuse color value, a specular color value, and a density value. The relightable NeRF model may be used to generate 2D representations of the scene from arbitrary viewpoints and under arbitrary illumination conditions. The relightable NeRF model includes a NeRF model that generates density values for 3D locations in the scene and an OLAT model that generates color values for 3D locations in the scene. The relightable NeRF model further includes a spherical codebook that provides an OLAT code as an input feature vector to the OLAT model.

In operation, the training engine trains the relightable NeRF model on a data set of 2D representations of the 3D scene. Each 2D representation in the data set further includes ground truth data including a viewing direction for the 2D representation and a lighting map including illumination information for the scene. The combined output of the trained relightable NeRF model is a radiance field function representing the 3D scene. The training goal for the training engine is to produce a radiance field function such that 2D renderings of the 3D scene from different viewpoints generated based on the radiance field function match the ground truth 2D representations in the training data set. The training engine achieves the training goal by minimizing a loss function that represents at least a difference between a 2D rendering generated by the relightable NeRF model and ground truth data associated with the corresponding 2D representation in the training data set. At the conclusion of training, the relightable NeRF model may be used to render novel 2D representations of the scene focused on arbitrary locations within the scene, viewed from arbitrary viewpoints under arbitrary illumination conditions.

One technical advantage of the disclosed technique relative to the prior art is that the disclosed technique may generate 2D representations of a scene not only from arbitrary viewpoints but also under arbitrary lighting conditions. Unlike existing techniques that are limited to producing 2D representations with fixed illumination characteristics, the disclosed technique allows for realistically rendering 2D representations of a scene into a variety of environments with different illumination conditions.

1. In various embodiments, a computer-implemented method comprises determining, for each of a plurality of three-dimensional (3D) locations in a 3D scene, a density value associated with the 3D location based on an output of a first trained machine learning model, determining, for each of the plurality of 3D locations, a diffuse color value and a specular color value associated with the 3D location based on a given camera location, a given lighting map, and an output of a second trained machine learning model, determining a pixel color value for each of a plurality of pixels in a two-dimensional (2D) representation of the scene based on the density values, the diffuse color values, and the specular color values associated with the plurality of 3D locations, and generating, based on the pixel color values associated with the plurality of pixels, a 2D rendering of the scene.

2. The computer-implemented method of clause 1, further comprising generating, using the first trained machine learning model, a neural feature vector based on the 3D location, and transmitting the neural feature vector to the second trained machine learning model.

3. The computer-implemented method of clause 1 or 2, wherein the first trained machine learning model is a neural radiance field (NeRF) model and the second trained machine learning model is a "one light at a time" (OLAT) model.

4. The computer-implemented method of any of clauses 1-3, wherein the lighting map includes position information associated with each of a plurality of light sources.

5. The computer-implemented method of any of clauses 1-4, further comprising generating, based on the 3D location and the lighting map, a light direction that represents a direction from one of the plurality of light sources to the 3D location in the scene, calculating, using a spherical codebook, an OLAT code based on the light direction, and transmitting the OLAT code to the second trained machine learning model, wherein the second trained machine learning model is a "one light at a time" (OLAT) model.

6. The computer-implemented method of any of clauses 1-5, wherein calculating the OLAT code further comprises multiplying a spherical harmonic parameterization of the light direction by a matrix of learned coefficients included in the spherical codebook.

7. The computer-implemented method of any of clauses 1-6, wherein for each 3D location, the steps of generating the light direction, calculating the OLAT code based on the light direction, and transmitting the OLAT code to the second trained machine learning model are repeated for each of the plurality of light sources included in the lighting map.

8. In various embodiments, one or more non-transitory computer-readable media store instructions that, when executed by one or more processors, cause the one or more processors to perform the steps of determining, for each of a plurality of three-dimensional (3D) locations in a 3D scene, a density value associated with the 3D location based on an output of a first trained machine learning model, determining, for each of the plurality of 3D locations, a diffuse color value and a specular color value associated with the 3D location based on a given camera location, a given lighting map, and an output of a second trained machine learning model, determining a pixel color value for each of a plurality of pixels in a two-dimensional (2D) representation of the scene based on the density values, diffuse color values, and specular color values associated with the plurality of 3D locations, and generating, based on the pixel color values associated with the plurality of pixels, a 2D rendering of the scene.

9. The one or more non-transitory computer-readable media of clause 8, wherein the instructions further cause the one or more processors to perform the steps of generating, using the first trained machine learning model, a neural feature vector based on the 3D location, and transmitting the neural feature vector to the second trained machine learning model.

10. The one or more non-transitory computer-readable media of clause 8 or 9, wherein the first trained machine learning model is a neural radiance field (NeRF) model and the second trained machine learning model is a one light at a time (OLAT) model.

11. The one or more non-transitory computer-readable media of any of clauses 8-10, wherein the lighting map includes position information associated with each of a plurality of light sources.

12. The one or more non-transitory computer-readable media of any of clauses 8-11, wherein the instructions further cause the one or more processors to perform the steps of generating, based on the 3D location and the lighting map, a light direction that represents a direction from one of the plurality of light sources included in the lighting map to the 3D location in the scene, calculating, using a spherical codebook, an OLAT code based on the light direction, and transmitting the OLAT code to the second trained machine learning model.

13. The one or more non-transitory computer-readable media of any of clauses 8-12, wherein calculating the OLAT code further comprises multiplying a spherical harmonic parameterization the light direction by a matrix of learned coefficients included in the spherical codebook.

14. The one or more non-transitory computer-readable media of any of clauses 8-13, wherein for each 3D location, the steps of generating the light direction, calculating the OLAT code based on the light direction, and transmitting the OLAT code to the second trained machine learning model are repeated for each of the plurality of light sources included in the lighting map.

15. In various embodiments, a computer-implemented method comprises determining, based on a plurality of two-dimensional (2D) representations of a three-dimensional (3D) scene, a first radiance field function associated with a first machine learning model, determining, based on the plurality of 2D representations of the 3D scene, a second radiance field function associated with a second machine learning model, generating a combined radiance field function based on the radiance field functions associated with the first machine learning model and the second machine learning model, generating, based on the combined radiance field function, a color value for a pixel in a 2D rendering of the scene, computing a rendering loss based on a difference between the color value for the pixel and a ground truth color value associated with a corresponding pixel in a corresponding one of the plurality of 2D representations, and modifying at least one of the first machine learning model or the second machine learning model based on the rendering loss.

16. The computer-implemented method of clause 15, further comprising generating, using the first machine learning model, a neural feature vector based on a 3D location in the 3D scene, and transmitting the neural feature vector to the second machine learning model.

17. The computer-implemented method of clause 15 or 16, wherein the first machine learning model is a neural radiance field (NeRF) model and the second machine learning model is a "one light at a time" (OLAT) model.

18. The computer-implemented method of any of clauses 15-17, wherein the rendering loss is a mean-squared error measurement of the difference between the color value for the pixel and the ground truth color value.

19. The computer-implemented method of any of clauses 15-18, further comprising iteratively training the first machine learning model and the second machine learning model until the rendering loss is below a predetermined threshold.

20. The computer-implemented method of any of clauses 15-19, wherein each of the plurality of 2D representations of the 3D scene includes positioning information for a camera and for one or more light sources.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for performing scene rendering, the computer-implemented method comprising:
    determining, for each of a plurality of three-dimensional (3D) locations in a 3D scene via execution of a first trained machine learning model, a density value associated with the 3D location;
    determining, for each of the plurality of 3D locations via execution of a second trained machine learning model, a diffuse color value and a specular color value associated with the 3D location based on a given camera location and a given lighting map;
    determining a pixel color value for each of a plurality of pixels in a two-dimensional (2D) representation of the scene based on the density values, the diffuse color values, and the specular color values associated with the plurality of 3D locations; and
    generating, based on the pixel color values associated with the plurality of pixels, a 2D rendering of the scene.

2. The computer-implemented method of claim 1, further comprising:
    generating, using the first trained machine learning model, a neural feature vector based on the 3D location; and
    transmitting the neural feature vector to the second trained machine learning model.

3. The computer-implemented method of claim 1, wherein the first trained machine learning model is a neural radiance field (NeRF) model and the second trained machine learning model is a "one light at a time" (OLAT) model.

4. The computer-implemented method of claim 1, wherein the lighting map includes position information associated with each of a plurality of light sources.

5. The computer-implemented method of claim 4, further comprising:
    generating, based on the 3D location and the lighting map, a light direction that represents a direction from one of the plurality of light sources to the 3D location in the scene;
    calculating, using a spherical codebook, an OLAT code based on the light direction; and
    transmitting the OLAT code to the second trained machine learning model,
    wherein the second trained machine learning model is a "one light at a time" (OLAT) model.

6. The computer-implemented method of claim 5, wherein calculating the OLAT code further comprises multiplying a spherical harmonic parameterization of the light direction by a matrix of learned coefficients included in the spherical codebook.

7. The computer-implemented method of claim 5, wherein for each 3D location, the steps of generating the light direction, calculating the OLAT code based on the light direction, and transmitting the OLAT code to the second trained machine learning model are repeated for each of the plurality of light sources included in the lighting map.

8. One or more non-transitory computer-readable media storing instructions that, when executed by one or more processors, cause the one or more processors to perform the steps of:

determining, for each of a plurality of three-dimensional (3D) locations in a 3D scene via execution of a first trained machine learning model, a density value associated with the 3D location;

determining, for each of the plurality of 3D locations via execution of a second trained machine learning model, a diffuse color value and a specular color value associated with the 3D location based on a given camera location and a given lighting map;

determining a pixel color value for each of a plurality of pixels in a two-dimensional (2D) representation of the scene based on the density values, diffuse color values, and specular color values associated with the plurality of 3D locations; and generating, based on the pixel color values associated with the plurality of pixels, a 2D rendering of the scene.

9. The one or more non-transitory computer-readable media of claim 8, wherein the instructions further cause the one or more processors to perform the steps of:

generating, using the first trained machine learning model, a neural feature vector based on the 3D location; and transmitting the neural feature vector to the second trained machine learning model.

10. The one or more non-transitory computer-readable media of claim 8, wherein the first trained machine learning model is a neural radiance field (NeRF) model and the second trained machine learning model is a one light at a time (OLAT) model.

11. The one or more non-transitory computer-readable media of claim 8, wherein the lighting map includes position information associated with each of a plurality of light sources.

12. The one or more non-transitory computer-readable media of claim 11, wherein the instructions further cause the one or more processors to perform the steps of:

generating, based on the 3D location and the lighting map, a light direction that represents a direction from one of the plurality of light sources included in the lighting map to the 3D location in the scene;

calculating, using a spherical codebook, an OLAT code based on the light direction; and transmitting the OLAT code to the second trained machine learning model.

13. The one or more non-transitory computer-readable media of claim 12, wherein calculating the OLAT code further comprises multiplying a spherical harmonic parameterization the light direction by a matrix of learned coefficients included in the spherical codebook.

14. The one or more non-transitory computer-readable media of claim 12, wherein for each 3D location, the steps of generating the light direction, calculating the OLAT code based on the light direction, and transmitting the OLAT code to the second trained machine learning model are repeated for each of the plurality of light sources included in the lighting map.

15. A computer-implemented method for performing scene rendering, the computer-implemented method comprising:

determining, based on a plurality of two-dimensional (2D) representations of a three-dimensional (3D) scene, a first radiance field function associated with a first machine learning model;

determining, based on the plurality of 2D representations of the 3D scene, a second radiance field function associated with a second machine learning model;

generating a combined radiance field function based on the radiance field functions associated with the first machine learning model and the second machine learning model;

generating, based on the combined radiance field function, a color value for a pixel in a 2D rendering of the scene;

computing a rendering loss based on a difference between the color value for the pixel and a ground truth color value associated with a corresponding pixel in a corresponding one of the plurality of 2D representations; and modifying at least one of the first machine learning model or the second machine learning model based on the rendering loss.

16. The computer-implemented method of claim 15, further comprising:

generating, using the first machine learning model, a neural feature vector based on a 3D location in the 3D scene; and transmitting the neural feature vector to the second machine learning model.

17. The computer-implemented method of claim 15, wherein the first machine learning model is a neural radiance field (NeRF) model and the second machine learning model is a "one light at a time" (OLAT) model.

18. The computer-implemented method of claim 15, wherein the rendering loss is a mean-squared error measurement of the difference between the color value for the pixel and the ground truth color value.

19. The computer-implemented method of claim 15, further comprising iteratively training the first machine learning model and the second machine learning model until the rendering loss is below a predetermined threshold.

20. The computer-implemented method of claim 15, wherein each of the plurality of 2D representations of the 3D scene includes positioning information for a camera and for one or more light sources.

* * * * *